May 11, 1926.
J. H. LACY
AUTOMOBILE BRAKE GUARD
Filed Nov. 9, 1921
1,584,233
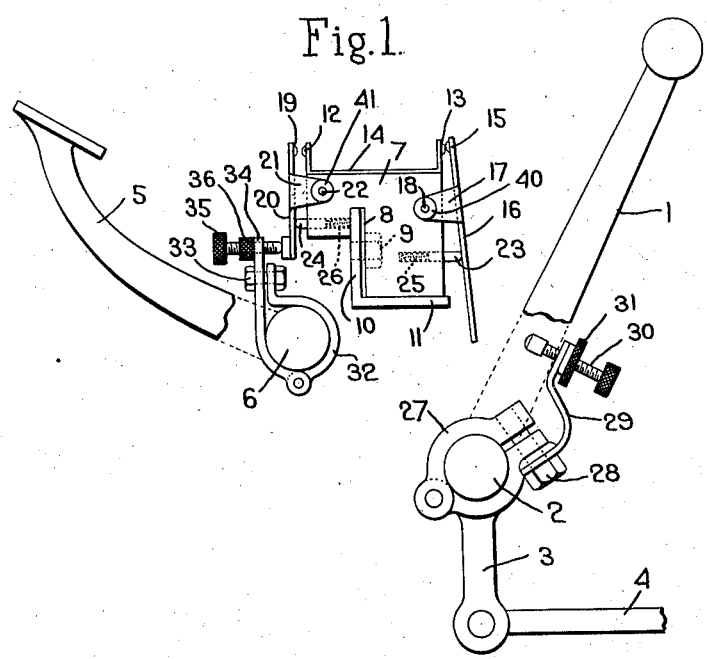
Fig.1.
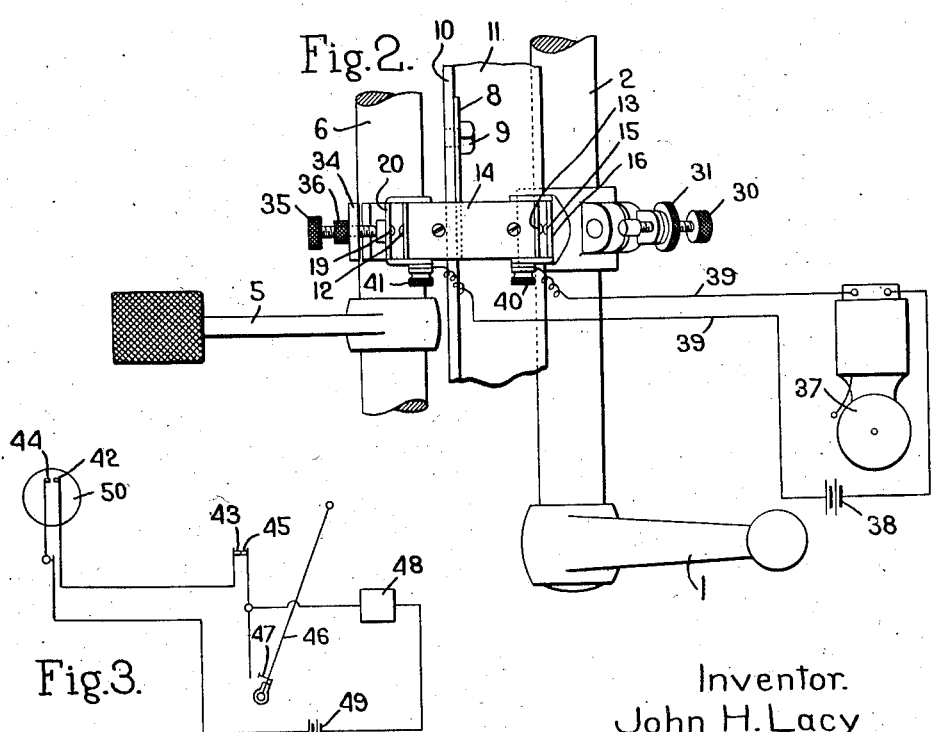
Fig.2.
Fig.3.
Inventor.
John H. Lacy
by Heard Smith & Tennant
Attys.

Patented May 11, 1926.

1,584,233

UNITED STATES PATENT OFFICE.

JOHN HOWARD LACY, OF BOSTON, MASSACHUSETTS.

AUTOMOBILE BRAKE GUARD.

Application filed November 9, 1921. Serial No. 514,074.

This invention relates to and has for its object the provision of means for guarding the brake of an automobile or similar machine so as to prevent the starting thereof with the brake wholly or partially applied.

It is a common experience with operators of automobiles to start or attempt to start the automobile with a brake such as the emergency brake applied or in locking position. This is obviously undesirable resulting in undue strain upon the engine and upon the mechanism of the vehicle and producing excessive wear upon the brake mechanism.

The object of this invention is to provide suitable mechanism for preventing such an occurrence either through mechanically or electrically controlled means.

More specifically the object of the invention is to provide a signal such as a bell or a light which will be operated whenever the brake mechanism is applied and an actuator such for example as the clutch is moved to affect the connection of the engine to the driving wheels.

The object of the invention is further to provide a simple practical form of mechanism which may readily be embodied in existing automobiles.

These and other objects and features of the invention will appear more fully from the accompanying description and drawings and will be particularly pointed out in the claims.

In the drawings:

Fig. 1 is a side elevation of the main portions of a preferred form of electrically controlled apparatus embodying the invention in position in an ordinary type of automobile mechanism.

Fig. 2 is a top plan view of the construction shown in Fig. 1 together with a diagrammatic illustration of an electric circuit, a source of electric energy and a signal.

Fig. 3 is a diagrammatic illustration of the main elements involved in the apparatus.

The invention being adaptable to a wide range of machines such for example as automobiles and not being concerned with any of the mechanism of the machine or vehicle other than those parts to which it is directly connected, it is unnecessary to illustrate or describe in detail the mechanism of the machine or automobile.

In Figures 1 and 2 a brake actuator is shown in the form of the ordinary emergency brake of an automobile comprising the upstanding arm or handle 1 connected to the horizontal rotatable shaft 2, the arm 3 connected to and extending downwardly from the shaft 2 and the rod 4 pivoted to the lower end of the arm 3 and running to the brake mechanism. In the form illustrated it is assumed that a movement of the arm 1 and shaft 2 clockwise to a position such as illustrated will apply the brake mechanism while a movement in the opposite direction will release the brake mechanism.

Again in Figures 1 and 2 a connection actuator is shown in the form of a clutch pedal 5 connected to a horizontal rotatable shaft 6. This is illustrated as of an ordinary type adapted to control the clutch which connects and disconnects the engine to the driving elements or wheels or rear wheels of the automobile. In the construction illustrated it is assumed that when the clutch pedal 5 is moved clockwise by the usual spring to the position shown the engine will be connected to the driving elements and when moved in the opposite direction by the operator's foot will be disconnected therefrom.

It is to be understood, of course, that there may be other and additional means for effecting the connection and disconnection of the engine to the driving elements such for example as the usual transmission mechanism.

The invention in fact is to be considered as utilizing any connection actuator which is movable to affect the connection and disconnection of the engine to the driving elements that is any one of the various elements which have to be moved to effect this result such as the clutch pedal or transmission shifting lever.

In the particular embodiment of the invention illustrated electrically controlled means are employed but the invention in its broader aspects is not limited to electrical means.

In the construction illustrated a bracket 7 shown as a block of insulating material is secured, as by means of a plate 8 projecting therefrom and a bolt 9 passing through the plate, to the upstanding flange 10 of a frame member 11 of the automobile. This insulating bracket 7 has mounted thereon a pair of fixed contacts 12 and 13 shown as formed on a metal plate 14 secured to the block. A pair of movable contacts are mounted on this bracket block 7 to co-operate respectively with the fixed contacts. Each movable contact is shown in the form of a plate pivoted to the block 7. The movable contact 15 is on the upper end of the plate 16 pivoted by means of the projecting arms 17 at 18 to the block. In the same manner the movable contact 19 is on the upper end of the plate 20 pivoted by means of the projecting arms 21 at 22 to the block 7. Both of these movable contacts act normally to close upon their respective fixed contacts. This result is conveniently secured by plungers 23 and 24 slidingly mounted in the block 7 and projected outwardly by springs 25 and 26 against the lower or depending ends of the plates 16 and 20 respectively.

The brake actuator arm 1 controls the movement of the movable contact 15 and the connection actuator 5 controls the movement of the movable contact 19. As a convenient means for securing this control the shaft 2 of the brake actuator has adjustably mounted thereon a split collar 27 locked in adjusted position by a set screw 28 and carrying an upstanding striker arm 29. A set screw 30 is adjustably mounted in the end of the striker arm and locked in place by a lock nut 31. A similar construction is provided in the case of the connection actuator, a split collar 32 being adjustably secured to the shaft 6 and locked in place by the bolt 33. The upstanding striker arm 34 of the collar 32 is likewise provided with a set screw 35 adjustable therein and locked in place by the lock nut 36.

The fixed and movable contacts are included in an electric circuit shown diagrammatically in Figure 2. The electric circuit also includes a suitable signal which may be of the visual or audible type but is herein shown as an electric bell 37. It also includes a suitable source of electric energy herein shown as a battery 38 which may be the starting battery commonly found in automobiles. One arm 39 of the circuit extends as shown to a binding post 40 on the pivot of the plate 16 while the other arm of the circuit extends to a binding post 41 on the pivot of the plate 20.

It will thus be seen that all the parts illustrated may readily be applied to existing automobiles. All that is necessary is to bolt or otherwise secure the insulation plug 7 in place to some part of the frame such as the frame member 11 and to secure adjustably in place the collars 27 and 32 on the respective shafts 2 and 6 and adjust the set screws 30 and 35.

The operation of the apparatus will also be apparent. When the brake mechanism is applied the arm 1 is moved clockwise releasing the movable contact plate 16 so that it closes against the fixed contact 13 as shown in Figure 1. The electric circuit is now closed at this point. The connection actuator herein exemplified in the clutch pedal 5 normally stands in the position shown in Figure 1 holding the movable contact 19 away from the fixed contact 12 and therefore maintaining the circuit open at this point. If now an attempt is made to start the car and connect the engine to the driving elements the first operation naturally performed is to depress the clutch pedal. This releases the movable contact plate 20 so that its contact 19 closes upon the fixed contact 12 thus finally closing the electric circuit and causing the signal such as the bell 37 to sound and thus warn the operator.

As already pointed out any movable actuator employed at any point for effecting the connection of the engine to the driving elements or the starting of the car may be employed to control the closing of the circuit at one point and the clutch pedal is to be considered merely as one exemplification of this feature. This idea is graphically and diagrammatically illustrated in Figure 3. Here the fixed contacts are represented at 42 and 43, the movable contacts at 44 and 45, the brake actuator at 46 with its striker arm at 47, the signal at 48, the source of electric energy at 49 while the circle 50 represents any device the movement of which to effect the connection and disconnection of the engine to the driving elements may be utilized to control the co-operation of the contacts 42 and 44.

Having thus described my invention what I claim as new and desire to secure by Letters Patent is:

1. In an automobile a brake actuator movable to apply and release brake mechanism, a clutch actuator movable to effect the connection and disconnection of the engine to the driving elements, a signal, and means controlled by the absence of the brake actuator from releasing position to operate the signal upon the movement of the clutch actuator.

2. In an automobile a brake actuator movable to apply and release brake mechanism, a connection actuator movable to effect the connection and disconnection of the engine to the driving elements, an electric circuit, a source of electric energy in the circuit, a signal in the circuit operable upon the closing of the circuit, a pair of fixed contacts in the circuit, a pair of movable contacts in the circuit co-operating respectively with the fixed contacts, means acting normally to close the movable contacts upon the fixed contacts, means connected with the brake actuator acting upon the movement thereof from releasing position to permit one of the movable contacts to close upon its co-operating fixed contact, and means connected with the connection actuator acting upon the movement of the connection actuator to permit the closing of the other movable contact upon its co-operating contact whereby the automobile is prevented from being started with the brake mechanism applied without the operation of the signal.

3. In an automobile a brake actuator including a rotatable shaft to apply and release brake mechanism, a connection actuator including a rotatable shaft to effect the connection and disconnection of the engine to the driving elements, a frame member, a bracket mounted on the frame member, a pair of fixed contacts mounted on the bracket, a pair of movable contacts mounted on the bracket and co-operating respectively with the fixed contacts, means acting normally to close the movable contacts upon the fixed contacts, an electric circuit including the fixed and movable contacts, a source of electric energy in the circuit, a signal in the circuit operable upon the closing thereof and striker members mounted respectively upon the brake actuator and connection actuator shafts, the striker member on the brake actuator shaft acting upon the absence of the brake actuator from releasing position to permit the movement of one of the movable contacts to closing position and the striker member upon the connection actuator shaft acting upon the movement of the connection actuator to permit the movement of the other movable contact to closing position.

4. In an automobile, a brake actuator movable to apply and release brake mechanism, a clutch actuator movable to effect the connection and disconnection of the engine to the driving elements, and means controlled by the absence of the brake actuator from releasing position to give an audible signal upon the movement of the clutch actuator.

In testimony whereof, I have signed my name to this specification.

JOHN HOWARD LACY.